US011210820B2

(12) United States Patent
Andreyev et al.

(10) Patent No.: US 11,210,820 B2
(45) Date of Patent: Dec. 28, 2021

(54) ITERATIVE IMAGE RECONSTRUCTION WITH DYNAMIC SUPPRESSION OF FORMATION OF NOISE-INDUCED ARTIFACTS

(71) Applicant: KONINKLIJKE PHILIPS N.V., Eindhoven (NL)

(72) Inventors: Andriy Andreyev, Willoughby Hills, OH (US); Chuanyong Bai, Solon, OH (US); Bin Zhang, Cleveland, OH (US); Faguo Yang, Highland Heights, OH (US); Shekhar Dwivedi, Willoughby Hills, OH (US); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 18 days.

(21) Appl. No.: 16/336,562

(22) PCT Filed: Sep. 25, 2017

(86) PCT No.: PCT/EP2017/074152
§ 371 (c)(1),
(2) Date: Mar. 26, 2019

(87) PCT Pub. No.: WO2018/060106
PCT Pub. Date: Apr. 5, 2018

(65) Prior Publication Data
US 2019/0228546 A1    Jul. 25, 2019

Related U.S. Application Data

(60) Provisional application No. 62/401,957, filed on Sep. 30, 2016.

(51) Int. Cl.
*G06T 7/136*        (2017.01)
*G06T 11/00*        (2006.01)

(52) U.S. Cl.
CPC ............ *G06T 11/006* (2013.01); *G06T 7/136* (2017.01); *G06T 2207/10104* (2013.01); *G06T 2207/10108* (2013.01); *G06T 2211/424* (2013.01)

(58) Field of Classification Search
CPC .................. G06T 11/006; G06T 7/136; G06T 2207/10104; G06T 2207/10108; G06T 2211/424
See application file for complete search history.

(56) References Cited

U.S. PATENT DOCUMENTS

| 8,538,099 B2 | 9/2013 | Fessler |
| 2007/0217566 A1 | 9/2007 | Chen |

(Continued)

OTHER PUBLICATIONS

Chan et al., Regularized image reconstruction with an anatomically adaptive prior for positron emission tomography, 2009, Physics in Medicine and Biology, (Year: 2009).*

(Continued)

*Primary Examiner* — Said M Elnoubi

(57) ABSTRACT

Iterative reconstruction (20) of imaging data is performed to generate a sequence of update images (22) terminating at a reconstructed image. During the iterative reconstruction, at least one of an update image and a parameter of the iterative reconstruction is adjusted using an adjustment process separate from the iterative reconstruction. In some embodiments using an edge-preserving regularization prior (26), the adjustment process (30) adjusts an edge preservation threshold to reduce gradient steepness above which edge preservation applies for later iterations compared with earlier iterations. In some embodiments, the adjustment process includes determining (36, 38) for each pixel, voxel, or region of a current update image whether its evolution prior to the current update image 22) satisfies an artifact feature criterion. A local noise suppression operation (40) is performed (Continued)

on the pixel, voxel, or region if the evolution satisfies the artifact feature criterion and is not performed otherwise.

19 Claims, 8 Drawing Sheets

(56) References Cited

U.S. PATENT DOCUMENTS

2013/0343673 A1 12/2013 Pal
2014/0126794 A1 5/2014 Ahn
2015/0093010 A1 4/2015 Yang

OTHER PUBLICATIONS

Nuyts et al., Performance of the Relative Difference Prior for Hot Lesion Detection in Whole-body PET/CT: an Evaluation with Numerical and Real Observers, 2005, IEEE Nuclear Science Symposium Conference Record (Year: 2005).*

Chan, et al: "Regularized image reconstruction with an anatomically adaptive prior for positron emission tomography", Physics in Medicine and Biology, Institute of Physics Publishing, Bristol GB, vol. 54, No. 24, Dec. 21, 2009.

Nuyts, et al: "Performance of the Relative Difference Prior for Hot Lesion Detection in Whole-Body PET/CT: an Evaluation with Numerical and Real Observers", Nuclear Science Symposium Conference Record, 2005 IEEE Wyndham El Conquistador Resort, Puerto Rico Oct. 23-29, 2005, Piscataway, NJ, USA,IEEE, vol. 4, Oct. 23, 2005.

Nuyts, et al: "A concave prior penalizing relative differences for maximum-a-posteriori reconstruction in emission tomography", IEEE Trans. on Nuclear Science vol. 49 No. 1 pp. 56 60 (2002).

Sidky, et al: "Image reconstruction in circular cone-beam computed tomography by constrained, total-variation minimization", Phys. Med. Biol. 53 (2008) 4777-4807.

* cited by examiner

ITERATIVE IMAGE RECONSTRUCTION WITH DYNAMIC SUPPRESSION OF FORMATION OF NOISE-INDUCED ARTIFACTS

CROSS REFERENCE TO RELATED APPLICATIONS

This application is the U.S. National Phase application under 35 U.S.C. § 371 of International Application No. PCT/EP2017/074152 filed Sep. 25, 2017, published as WO 2018/060106 on Apr. 5, 2018, which claims the benefit of U.S. Provisional Patent Application No. 62/401,957 filed Sep. 30, 2016. These applications are hereby incorporated by reference herein.

FIELD

The following relates generally to the radiological imaging arts, iterative image reconstruction arts, medical imaging arts, and the like.

BACKGROUND

Radioemission medical imaging includes, for example, positron emission tomography (PET) and single photon emission computed tomography (SPECT). In PET imaging, a medical imaging subject is administered a radiopharmaceutical containing a radioisotope that emits positrons during radioactive decay—the resulting electron-positron annihilation events each produce two oppositely directed 511 keV gamma ray pairs. In SPECT imaging, the radiopharmaceutical contains a radioisotope that decays to produce radioactive emission product(s) that are directly detected by a gamma camera. In either case, patient safety dictates that the concentration of administered radioisotope should be as low as feasible to limit the radiation dose received by the medical imaging subject. Consequently, the acquired imaging data are noisy and may be incomplete. Iterative reconstruction techniques have demonstrated capability to generate high quality reconstructed images from noisy and/or incomplete imaging data sets, and accordingly have become standard image reconstruction technology for PET and SPECT imaging data reconstruction.

Transmission computed tomography (CT) imaging employs an external x-ray tube that transmits an x-ray beam through the medical imaging subject, and an x-ray detector array is arranged in opposition to detect the transmitted x-ray beam. Traditionally, the signal level in CT is much higher than in PET and SPECT imaging. However, more recent trends have been toward using reduced x-ray beam intensity or imposing other radiation exposure reduction techniques such as intermittent shuttering the x-ray beam. These approaches increase CT imaging data noise levels, and may also result in incomplete imaging data sets. Consequently, iterative reconstruction techniques are increasingly finding application in CT.

Further tolerance of noise and incomplete data can be obtained by use of regularization during the iterative reconstruction. In one approach, regularization is introduced by way of an added noise-suppressing prior, such as a quadratic prior. To avoid suppressing real physical features in the reconstructed image, an edge-preserving prior is commonly used (such as a relative differences prior proposed by Nuyts et al., "A concave prior penalizing relative differences for maximum-a-posteriori reconstruction in emission tomography", IEEE Trans. on Nuclear Science vo. 49 no. 1 pp. 56-60 (2002)). The edge-preserving prior is designed to suppress small amplitude variations likely to be due to noise, but not larger amplitude variations likely to be attributable to real physical features. A trade-off exists between stronger edge preservation on the one hand, and stronger noise suppression on the other hand. In most edge-preserving priors, a threshold may be adjusted to achieve the desired trade-off.

Iterative image reconstruction with an edge-preserving relative difference prior is often effective in producing a reconstructed image that retains the real physical features used for medical interpretation while effectively suppressing unwanted noise that can obscure these features. However, in some instances the noise suppression is insufficient, and can lead to an erroneous radiology finding. In other instances the noise suppression is too strong and may suppress a real feature with low contrast, again potentially leading to an erroneous radiology finding.

Accordingly, there remains an unfulfilled need for improved iterative image reconstruction technologies that overcome the foregoing deficiencies and others.

SUMMARY

In one disclosed aspect, a non-transitory storage medium stores instructions readable and executable by a computer to perform an image reconstruction method comprising: performing iterative reconstruction of imaging data to generate a sequence of update images terminating at a reconstructed image; and during the iterative reconstruction and before the iterative reconstruction terminates at the reconstructed image, adjusting at least one of an update image produced by the iterative reconstruction and a parameter of the iterative reconstruction using an adjustment process separate from the iterative reconstruction. In some embodiments the iterative reconstruction includes an edge-preserving regularization prior having an edge preservation threshold, and the adjustment process comprises adjusting the edge preservation threshold to reduce gradient steepness above which edge preservation applies for later iterations of the iterative reconstruction compared with earlier iterations of the iterative reconstruction. In some embodiments the adjustment process comprises, for each pixel, voxel, or region of a current update image that precedes the terminating reconstructed image in the iterative reconstruction, determining whether an evolution of the value of a pixel, voxel, or region over update images prior to the current update image satisfies an artifact feature criterion. A local noise suppression operation is then performed for any pixel, voxel, or region of the current update image whose evolution satisfies the artifact feature criterion and is not performed for any pixel, voxel, or region of the current update image whose evolution does not satisfy the artifact feature criterion.

In another disclosed aspect, an image reconstruction method is disclosed. Imaging data are reconstructed by performing iterative reconstruction with an edge-preserving regularization prior to generate a reconstructed image. During the iterative reconstruction, an edge preservation threshold of the edge-preserving regularization prior is adjusted as a function of the number of performed iterations of the iterative reconstruction. The reconstructed image is displayed on a display. The reconstructing and the adjusting are suitably performed using a computer.

In another disclosed aspect, an image reconstruction device is disclosed. A computer is programmed to perform iterative reconstruction of imaging data to generate a sequence of update images terminating at a reconstructed image. A display is operatively connected with the computer to display the reconstructed image. The computer is further programmed to adjust a current update image of the iterative reconstruction that precedes the terminating reconstructed image in the iterative reconstruction by operations including: for each pixel, voxel, or region of the current update image, determining whether an evolution of the value of an pixel, voxel, or region over update images from iterations prior to the current update image in the iterative reconstruction satisfies an artifact feature criterion; and performing a local noise suppression operation for any pixel, voxel, or region of the current update image whose evolution satisfies the artifact feature criterion and not performing the local noise suppression operation for any pixel, voxel, or region of the current update image whose evolution does not satisfy the artifact feature criterion.

One advantage resides in improved noise-induced artifact feature suppression in iterative image reconstruction.

Another advantage resides in improved noise-induced artifact feature suppression in iterative image reconstruction with reduced concomitant loss in edge preservation for real features.

Another advantage resides in providing local detection and suppression of noise-induced artifact features in iterative image reconstruction.

Another advantage resides in leveraging different process flow evolution characteristics of noise-induced artifact features versus real features in providing preferential suppression of the former while preferentially retaining the latter.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention. Unless otherwise noted, the drawings are diagrammatic and are not to be construed as being to scale or to illustrate relative dimensions of different components.

DETAILED DESCRIPTION

Figure 1:
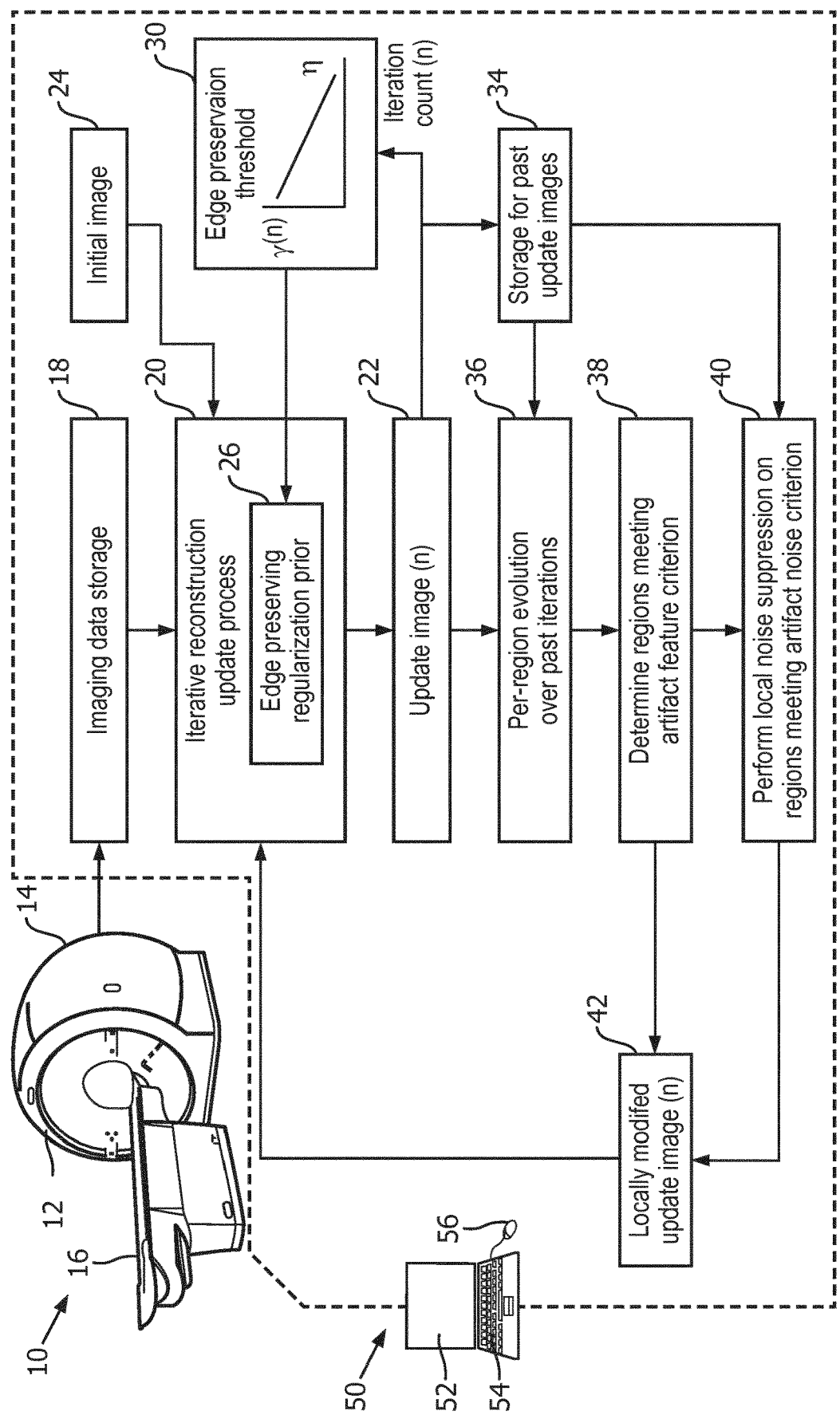
FIG. 1 diagrammatically shows a radiological imaging system including an imaging device and an image reconstruction device.

Improved iterative image reconstruction technologies disclosed herein are based in part based on certain insights disclosed herein.

One insight made herein is that while it is desirable to minimize noise generally, the adverse impact of noise in medical imaging applications is greatest when the noise produces an artifact feature that can be misinterpreted by medical personnel reading the image as a real physical feature.

Further insights are made herein in the context of process flow evolution of the iterative reconstruction, which proceeds by successive corrective updates to an image estimate. Each successive update outputs a modified reconstructed image estimate, also referred to herein as an update image. If the iterative reconstruction converges (which is desired), then the successive update images should exhibit increasingly close fidelity to the acquired imaging data as the iteration count of image updates increases. The change from one update image to the next should generally decrease as the number of iterations increases, and the change from one update image to the next should become negligible as the iterative reconstruction approaches convergence.

It is recognized herein that the process flow evolution of real image features often differs materially from the process flow evolution of noise-produced artifact features. Typically, a real physical image feature converges quickly, e.g. in the first few iterations in many iterative reconstruction examples; thereafter, the update-to-update change in the real feature is small as the reconstruction approaches convergence as just described. This is because the real image feature emerges due to the iterative reconstruction modifying successive update images to conform to real structure in the underlying imaging data, and once fidelity with this real structure in the underlying imaging data is achieved the feature does not further evolve in a significant way. By contrast, a noise-produced artifact feature usually "emerge" later in the iterative reconstruction as compared with real features, and may continue to evolve significantly even after the bulk of the image is approaching convergence. This is because the artifact feature does not conform to actual structure in the underlying imaging data, but instead is produced by over-fitting the noise.

A further insight made herein is that an artefact feature is often produced by a type of positive feedback or amplification, in which over-fitting of the noise by later updates of the iterative reconstruction amplifies a nucleus structure introduced by noise. The amplified random structural nucleus thereby grows to produce the artefact feature.

Partly in view of such insights, improved image reconstruction technology is disclosed herein which adjusts the iterative reconstruction from one image update to the next in a way that suppresses the nucleation of artifact features.

Some embodiments disclosed herein employ an edge-preserving regularization prior having an edge preservation threshold. In general, such an edge-preserving regularization prior is designed to penalize image gradients but to preserve steep gradients that are presumed to be real edges. In these embodiments, the edge preservation threshold is adjusted during the iterative reconstruction to reduce edge preservation (i.e. increase the gradient steepness above which the edge preservation applies) for later iterations of the iterative reconstruction compared with earlier iterations of the iterative reconstruction. This approach leverages the recognition herein that real features converge relatively quickly to edges defined by steep gradients, so that the reduced edge preservation in later iterations is not detrimental for these real features because they rapidly converge to steep gradients that are thereafter preserved even as the edge preservation threshold is adjusted for later iterations to increase the gradient steepness above which edge preservation applies. On the other hand, artefact features often nucleate later in the image reconstruction process flow, as the effects of over-fitting of the noise lead to nucleation of "speckles" or "hot spots" that then grow into artefact features. These features are unlikely to have converged to steep gradient edges by the time the reduced edge preservation in later iterations comes into effect—consequently, the reduced edge preservation with increasing iteration number enables the prior to suppress the later-nucleated artefact features before the edges of the artefact features can amplify to a steepness above which the edge preservation applies.

Some embodiments disclosed herein employ more active iterative reconstruction update adjustments. In these embodiments, differences in the typical process flow evolution of real features versus artefact features, as described previously, are leveraged to identify nucleation of artefact features. The identified incipient artefact features are suppressed, for example by locally replacing the values of pixels or voxels at the artefact feature with pixel or voxel values of earlier image updates produced prior to the onset of artefact feature nucleation. In a variant approach, the local replacement is by values of neighboring pixels or voxels located outside of the identified artefact feature. By removing the artefact feature nucleus at the time (along the process flow evolution) of its initial formation, there is no longer a nucleus to be amplified by the later image updates into an artefact feature.

With reference to FIG. 1, an imaging device 10 acquires imaging data, e.g. of a medical patient in the case of medical imaging. The illustrative imaging device 10 is a dual-modality imaging device including a transmission computed tomography (CT) gantry 12 and a positron emission tomography (PET) gantry 14. A common patient support couch 16 enables a patient to be moved into either gantry 12, 14 for imaging. An imaging data storage 18 stores CT and/or PET imaging data acquired by the imaging device 10. More generally, the imaging data may be acquired by any imaging device generating imaging data that is to be reconstructed by iterative reconstruction. As is known in the art, iterative image reconstruction is commonly applied for reconstructing PET imaging data and is sometimes applied for reconstructing CT imaging data, and is also commonly used for reconstructing some other types of imaging data such as single photon emission computed tomography (SPECT) imaging data acquired by a gamma camera. Note that if the multi-modality imaging device 10 acquires both CT and PET imaging data of the same subject, they are usually reconstructed separately, i.e. the CT imaging data are reconstructed using an iterative reconstruction process to generate a reconstructed CT image, and separately the PET imaging data are reconstructed using the same, or alternatively a different, iterative reconstruction process to generate a reconstructed PET image. If both CT and PET imaging data sets are acquired using the multimodality imaging device 10 then placement of the patient or other imaging subject on the common couch 16 advantageously facilitates spatial registration between the reconstructed CT and PET images.

To reconstruct the imaging data, an iterative image reconstruction process performs successive passes of an iterative reconstruction update process 20. Each pass of the iterative reconstruction update 20 outputs an update image 22 (also known as next image estimate). For ease of notation, the $n^{th}$ pass of the iterative reconstruction update 20 is denoted as outputting an update image enumerated as update image n. In general, the $(n+1)^{th}$ pass of the iterative reconstruction update 20 receives as input the immediately preceding update image numbered n, and employs the chosen iterative reconstruction update process 20 to modify the update image numbered n to produce successive update image numbered n+1 which (when forward projected or otherwise converted to projection space or other imaging data space) has improved fidelity to the acquired imaging data stored in the storage 18. The iterative reconstruction process terminates when the update image has sufficiently close fidelity to the imaging data as measured by a suitable stopping criterion, such as iteration-to-iteration change in the image being less than some threshold, and/or a quantitative difference between the forward projected update image and the acquired imaging data being below some threshold. In this way, iterative reconstruction of the imaging data is performed to generate a sequence of update images 22 terminating at a reconstructed image. To initiate the iterative image reconstruction process, the first (e.g. n=0) pass of the iterative reconstruction update process 20 receives as input some initial image 24, which commonly is a uniform intensity image, although if a priori information is available it can optionally be used to generate the initial image 24.

During the iterative reconstruction disclosed herein, and before the iterative reconstruction terminates at the reconstructed image, at least one of an update image and a parameter of the iterative reconstruction is adjusted using an adjustment process separate from the iterative reconstruction. By "separate from the iterative reconstruction" it is meant that the adjustment process is not the iterative reconstruction update process 20 of the iterative reconstruction. In the illustrative embodiment of FIG. 1, two such adjustment processes are diagrammatically shown.

A first iterative adjustment operates in the context of the iterative reconstruction update process 20 employing an edge-preserving regularization prior 26. In some examples herein, the iterative reconstruction process employs a one step late (OSL) MAP algorithm framework in which the update image 22 numbered (n+1) is iteratively improved as:

$$f_i^{(n+1)} = \frac{f_i^{(n)}}{s_i - \frac{\partial}{\partial f} U(f_i^{(n)})} * \sum_{j \in f_i} H_{ij}^{TOF} * \frac{g_j}{\sum_{i \in g_j} H_{ji}^{TOF} * f_i^{(n)} + Corr_j} \quad (1)$$

where $f_i^{(n+1)}$ denotes voxel i of the output update image numbered n+1, $f_i^{(n)}$ denotes voxel i of the input update image numbered n, and $H_{ij}^{TOF}$ is the forward- and backprojection operator incorporating all voxels that belong to a given line-of-response (LOR) $g_j$. The illustrative operator $H_{ij}^{TOF}$ assumes PET imaging data that includes time-of-flight (TOF) localization for each 511 keV gamma ray pair, as indicated by the superscript $^{TOF}$ notation. For SPECT imaging data or PET imaging data without TOF localization (or reconstructed without utilizing TOF localization even if available), the standard non-TOF-localized forward- and backprojection operator $H_{ij}$ would instead be used. Further, in Equation (1) $Corr_j$ is an optional data correction factor for projection j, and $s_i$ is a sensitivity coefficient for the voxel indexed i. In the embodiment of Equation (1), the edge-preserving regularization prior 26 is denoted $U(f_i^{(n)})$. While any edge-preserving regularization prior may in general be used, in the illustrative examples the edge-preserving regularization prior 26 is a relative differences prior (RDP), given by (see Nuyts et al., "A concave prior penalizing relative differences for maximum-a-posteriori reconstruction in emission tomography", IEEE Trans. on Nuclear Science vo. 49 no. 1 pp. 56-60 (2002)):

$$U(f_i^{(n)}) = -\beta \frac{(f_i^{(n)} - f_j^{(n)})^2}{f_i^{(n)} + f_j^{(n)} + \gamma|f_i^{(n)} - f_j^{(n)}|} \quad (2)$$

where β is an overall weight of the edge-preserving regularization prior, and γ controls edge preservation threshold, which is the parameter of the edge-preserving regularization prior 26 that controls the feature (or edge) preservation. In general, the edge preservation threshold γ scales the gradient steepness above which edge preservation applies. In the specific case of the RDP regularization prior of Equation (2), for image gradients (which represent edges of features in the image) that are greater than the scale set by the edge preservation threshold γ, the term $\gamma|f_i''-f_j''|$ in the denominator limits the regularization impact of $U(f_i'')$; whereas, for image gradients that are below the scale set by γ the quadratic numerator $(f_i''-f_j'')^2$ dominates to provide regularization. Again, the RDP of Equation (2) is merely an illustrative example of the edge-preserving regularization prior 26, and more generally other regularization priors may be used that include an edge preservation threshold whose value provides for suppression of the regularization for edges defined by image gradients whose steepness exceeds the scale set by the edge preservation threshold (and thereby "preserves" those edges and the corresponding features from being degraded by the regularization).

In general, selection of the regularization parameters (e.g., β and γ in illustrative RDP of Equation (2)) can significantly improve the resulting image quality by suppressing noise. On the other hand, suboptimal setting of these parameters can materially deteriorate the diagnostic potential by suppressing edges defining real features. Conventionally, the value of the edge preservation threshold γ has been chosen to best balance between these two opposing effects. However, when γ is chosen to avoid suppressing diagnostically significant edges of real features, it also passes a certain amount of noise artifact features, commonly referred to as "speckle" or "hot spots". It is recognized herein that these speckle artifact features arise in the following way. The value of γ is set high enough to preserve real edges. In doing so, however, this value of γ is low enough to allow certain noise fluctuations to reach above the edge preservation threshold γ. These noise fluctuations are then preserved by the edge-preservation provided by the edge-preserving regularization prior 26, and thereafter can be amplified by the resolution recovery modelling and finally appear as artifact features (speckles) that can potentially be misinterpreted as lesions. Conventionally, therefore, γ is selected to balance between the contradictory goals of being high enough to protect smaller image gradients in order to preserve real edges while at the same time being low enough to ensure that noise fluctuations are removed by the regularization. This balance generally cannot be fully achieved, thus leading to suppression of real features and resultant missing or impairing quantitation of a real lesion in the diagnosis, and/or leading to preservation and amplification of artifact features (speckles) which can lead to false detection of lesions.

Figure 2:
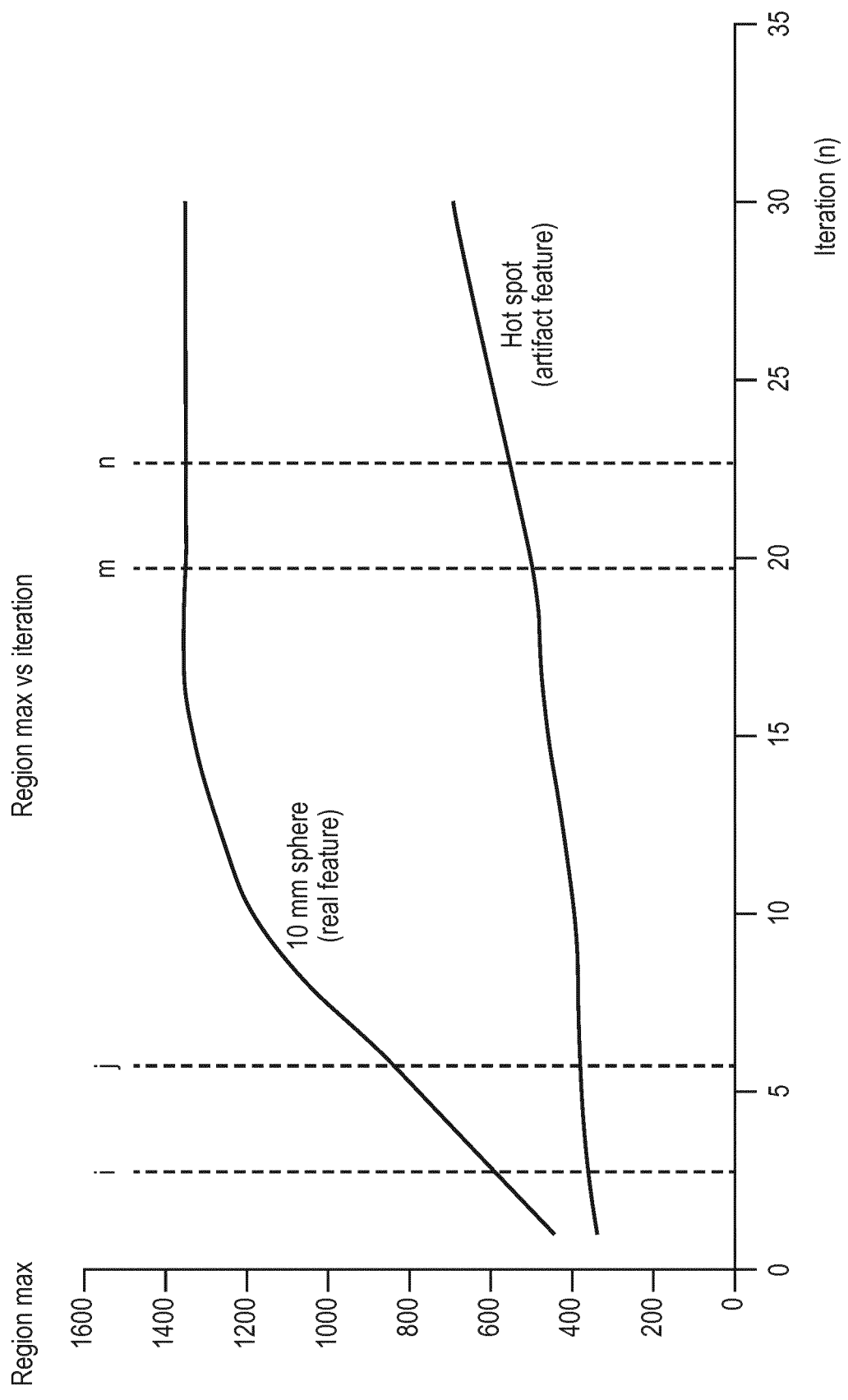
FIG. 2 plots the maximum value of a real 10 mm diameter sphere feature and an artificial noise-induced hot spot over the course of 20 iterations of an iterative image reconstruction.

With brief reference to FIG. 2, some insights made herein are leveraged to improve upon this unsatisfactory state in which γ is unable to achieve the desired combination of preservation of real features and suppression of artifact speckles. FIG. 2 plots data for iterative reconstruction of a phantom having a 10 mm diameter sphere (which is therefore a real feature). More particularly, FIG. 2 plots, as a function of image update iteration number n ranging from n=1 to n=30, the maximum value of the reconstructed image intensity value within region of interest (ROI) encircling the real 10 mm sphere, and the maximum value of image intensity inside ROI encircling an artificial hot spot generated by amplification of noise. It is seen in FIG. 2 that the maximum value of the 10 mm sphere (true feature) converged (that is, became roughly constant) after about 20 iterations. The change in the maximum value as a function of iteration number thus slowed down for the true feature after a few iterations. This can be viewed as reflecting that the real image feature representing the 10 mm sphere corresponds to the reconstructed image gaining fidelity with actual structure in the imaging data caused by imaging the real 10 mm sphere. In general, it is recognized herein that real features are likely to converge relatively quickly during an iterative image reconstruction.

On the other hand, the behavior was quite different for the hot spot. As seen in FIG. 2, the maximum value of the noise-induced hot spot does not appear immediately, but rather grows slowly and continuously with successive iteration number n from iteration 1 to 30. This reflects the fact that this hot spot edge does not reflect any real structure in the imaging data, but rather is generated by amplification of relatively small initial noise fluctuations by the iterative image reconstruction process that included resolution recovery.

Figure 3:
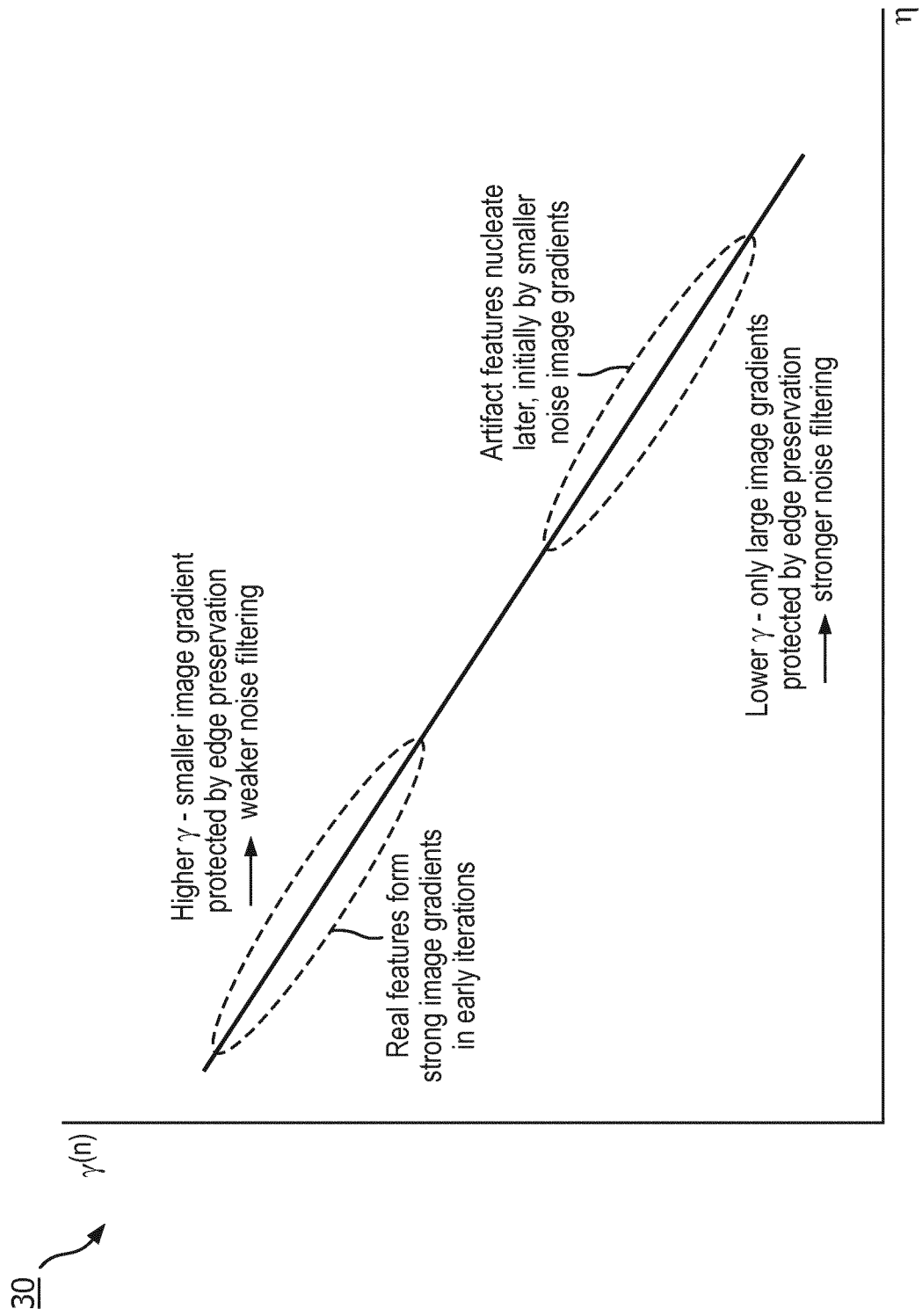
FIG. 3 plots a program for linear reduction of an edge-preserving threshold $\gamma$ of an edge-preserving regularization prior over successive iterations of an iterative reconstruction including the edge-preserving regularization prior.

With returning reference now to FIG. 1 and with further reference to FIG. 3, the foregoing insights lead to a disclosed approach in which, during the iterative reconstruction, the edge preservation threshold 26 is adjusted to reduce the gradient steepness above which edge preservation applies for later iterations of the iterative reconstruction compared with earlier iterations of the iterative reconstruction. In the illustrative embodiment this is accomplished by way of a linearly decreasing program 30 for the edge preservation threshold γ of the illustrative RDP regularization prior. The illustrative linear program 30 is shown in greater detail in FIG. 3, with selective annotation explaining the rationale for the illustrative design. During the early iterations, γ has its highest value. This means that smaller image gradients are preserved by the edge preservation. This does lead to weaker noise filtering, but as seen in FIG. 2 the initial level of noise at early iterations is relatively low. This initial phase of high γ value thus ensures that the edge preservation is strong (due to the smaller gradient steepness scale requirement for being preserved) so that real edges defining real features are preserved by the edge preservation and allowed to grow. This growth is large in the initial iterations (see the curve for the 10 mm sphere feature in FIG. 2). With reference back to FIG. 3, as the iterative reconstruction proceeds the update number n increases and γ decreases in accord with the program 30. For higher iteration numbers, this results in the edge preservation protecting only edges at larger gradient steepness levels. Since the real edges have crystallized in the early iterations (see the curve for the 10 mm sphere feature in FIG. 2) it follows that these strong real edges are still preserved in the later iterations in spite of the decreasing γ and consequent more stringent limit on edge preservation. By contrast, the artifact features nucleate later as noise due to the "slower" noise amplification process (see the curve for the hot spot artifact feature in FIG. 2) and so these noise features are more likely to be suppressed by the regularization as the edge preservation becomes weaker with decreasing γ value. This can be represented in the illustrative RDP prior by replacing γ by the iteration number-dependent value $\gamma^{(n)}$:

$$U(f_i^{(n)}) = -\beta \frac{(f_i^{(n)} - f_j^{(n)})^2}{f_i^{(n)} + f_j^{(n)} + \gamma^{(n)}|f_i^{(n)} - f_j^{(n)}|} \qquad (3)$$

By way of one more specific non-limiting illustrative embodiment, γ is designed to decrease linearly over a designated $n_{max}$ iterations according to:

$$\gamma^{(n)} = \gamma^{(start)} + (\gamma^{(end)} - \gamma^{(start)}) \cdot \frac{n}{n_{max}} \quad (4)$$

with $\gamma^{(n)}=\gamma^{(end)}$ for iterations (if any) numbered higher than $n_{max}$. In one even more specific non-limiting embodiments, the linear program of Equation (3) is used as the program 30 with $\gamma^{(start)}=1.5$ and $\gamma^{(end)}=0.5$ and $n_{max}=20$. These are merely illustrative examples, and other programs for adjusting the edge preservation threshold of the edge-preserving regularization prior 26 are contemplated depending upon the form of the prior and empirical analysis of the process flow evolution of real edges versus artificial edges during the iterative reconstruction of specific imaging data. For example, if it takes longer than in the illustrative embodiments for the real edges to stabilize then the program may include an initial constant period where $\gamma^{(n)}=\gamma^{(start)}$ before initiating the decrease in $\gamma^{(n)}$ with increasing iteration number n. Additionally or alternatively, a longer stabilization period for real edges might be accommodated by employing an initial sub-linear decrease in $\gamma^{(n)}$ with the initial iterations.

Figure 4:
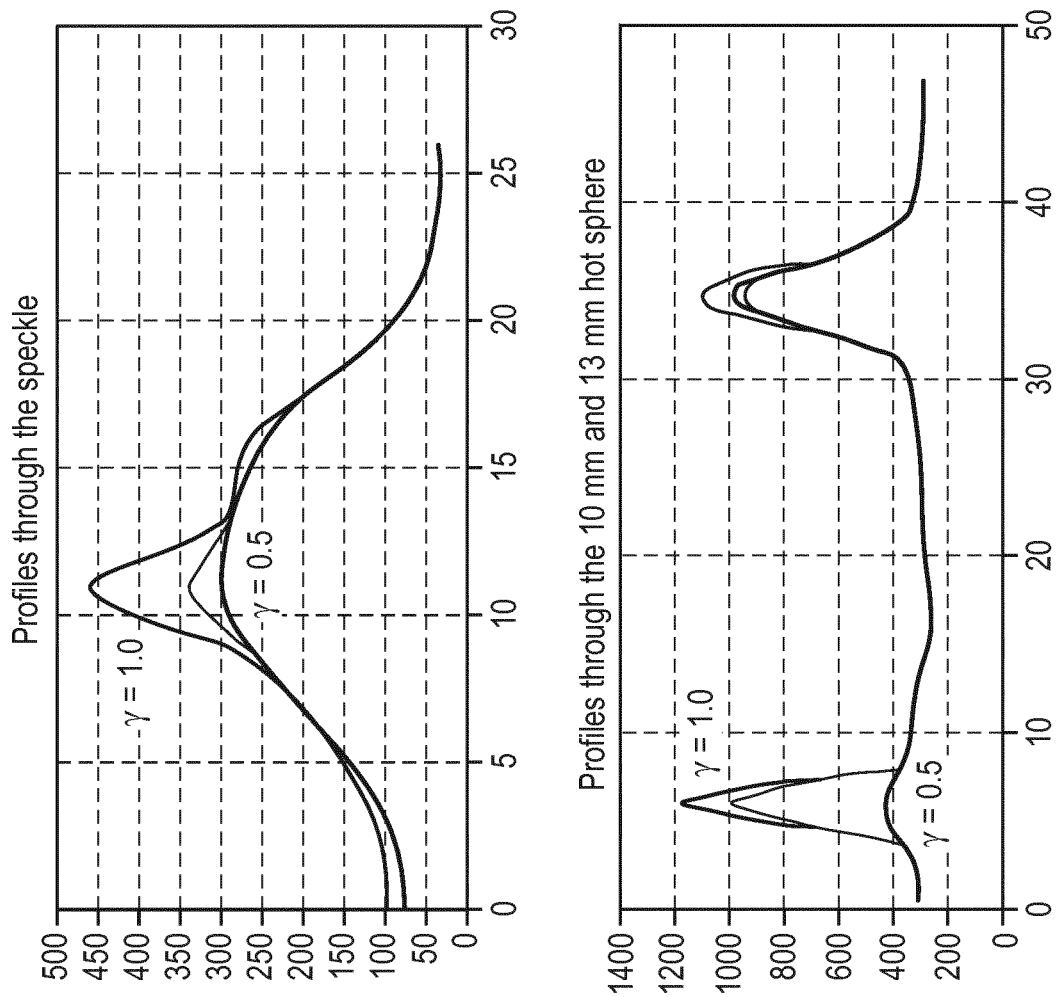
FIGS. 4-8 present phantom experiment results as described herein.
Figure 4:
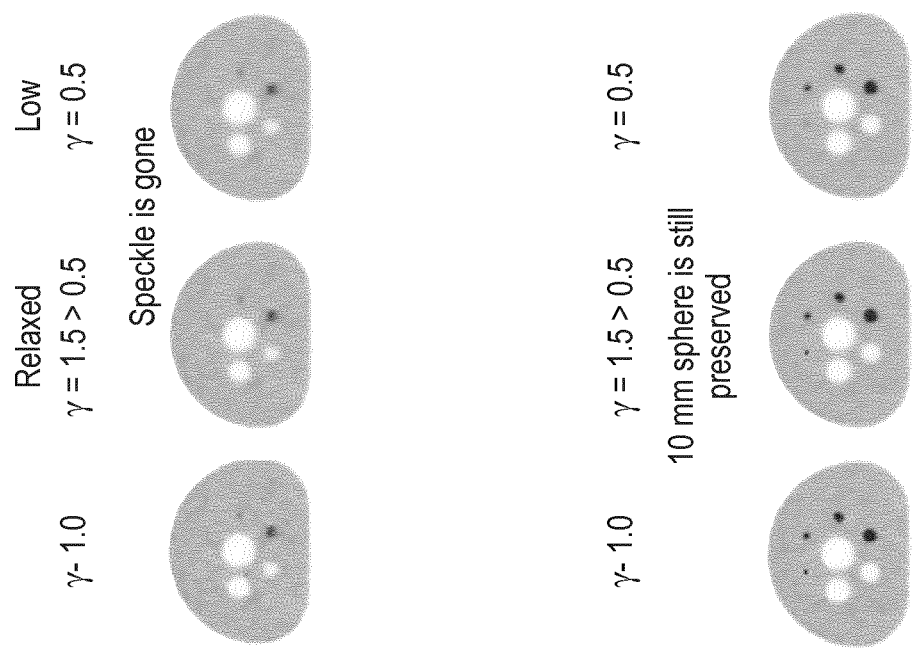

With reference now to FIG. 4, an example of the image quality improvement attainable using the disclosed programmed adjustment 30 of the edge preservation threshold 26 is presented. Phantom experiments were conducted to compare reconstruction using a linearly decreasing γ in accord with FIG. 3 with two different fixed iteration-independent values including a fixed γ=1.0 and a fixed γ=0.5. More particularly, FIG. 4 top row left to right shows: fixed γ=1, dynamically changing γ=1.5→0.5 in accord with the linear program 30 of FIG. 3, and fixed low γ=0.5, with corresponding reconstructed image intensity profiles shown in the rightmost plot illustrating the reduction of speckle with the second and third images. FIG. 4 bottom row left to right shows the same as the top row however showing the slice with useful features that are preserved in first two images (γ=1.0 and γ=1.5→0.5). As seen in FIG. 4, only the dynamically changing γ=1.5→0.5 was able to both reduce the speckle and preserve the contrast. All reconstructions shown in FIG. 4 were for the same three-dimensional dataset, using as the iterative reconstruction OSEM-MAP (ordered subsets expectation maximization—maximum a posteriori) with 20 iterations and 17 subsets. Note that in the each of the rightmost plots the highest curve is for γ=1.0, the lowest curve is for γ=0.5, and the middle curve is for γ=1.5→0.5.

As seen in FIG. 4, the phantom experiment with fixed γ=1.0 had good overall contrast and noise control, but had speckle artifacts nucleating and growing in later iterations. This reflects the strong edge preservation having the detrimental effect of also preserving noise-induced image gradients that grow sufficiently large. The phantom experiment with fixed γ=0.5 showed absence of speckles but also strongly reduced contrast in the useful features (10 mm sphere contrast has dropped by >70%). This reflects the weaker edge preservation failing to protect some real features. As observed in FIG. 4, the dynamically changing edge preservation threshold disclosed herein was able to achieve an advantageous trade-off: speckle has been suppressed while at the same time the useful contrast in the 10 mm sphere was reduced by only 20%.

The illustrative embodiments employ the illustrative (modified) RDP regularization prior of Equation (3) with the illustrative iterative reconstruction of Equation (1). More generally, the disclosed approach of a programmed adjustment of the edge preservation threshold as a function of iteration may be employed with any type of edge-preserving regularization prior that has an edge-preservation threshold. For example, the edge-preserving regularization prior may more generally be a relative difference prior proportional to:

$$\frac{(f_i - f_j)^2}{f_i + f_j + \gamma |f_i - f_j|} \quad (5)$$

where γ is the edge preservation threshold and $f_i$ and $f_j$ are image pixels or voxels. Even more generally, the disclosed approach may be used in conjunction with other edge-preserving regularization priors having a parameter that controls the extent of edge preservation (i.e. that has an edge-preservation threshold).

The selection of dynamic γ starting and ending values (e.g., the values $\gamma^{(start)}$ and $\gamma^{(end)}$ in Equation (4)) can be chosen empirically, and verified over a representative collection of imaging datasets spanning a credible range of imaging subjects (e.g. patients or other medical subjects in the case of medical imaging). Moreover, while in the example of Equation (3) only the edge preservation threshold γ is programmed to vary with iteration number n, it is also contemplated to vary other parameters of the regularization prior, such as the overall prior weight β of Equation (3), as a function of iteration number n in accordance with a program chosen to optimally balance preservation of real edges versus suppression of noise-induced artifact features.

With reference back to FIG. 1, as previously noted, during the iterative reconstruction disclosed herein, and before the iterative reconstruction terminates at the reconstructed image, at least one of an update image and a parameter of the iterative reconstruction is adjusted using an adjustment process operating separate from the iterative reconstruction. One illustrative adjustment process is the just-described programmed adjustment 30 of the edge preservation threshold of an edge-preserving regularization prior 26 optionally used in the iterative reconstruction.

A second such adjustment process diagrammatically shown in FIG. 1 as an illustrative example performs local detection of noise-induced artifact features and local suppression of such detected artifact features. In this approach, each successive update image 22 is stored in a storage 34 (or, alternatively, a sub-set of these may be stored, e.g. every fourth update image may be stored to reduce storage space requirements). The storage 34 may optionally be constructed as a first-in, first-out (FIFO) buffer that stores the "N" most recent update images. Based on these update images, a per-region evolution 36 over past iterations is computed for each region of the image. A "region" in this context may be a single pixel or voxel, or may be a larger region defined arbitrarily (e.g. each region may be an n×n square block of pixels or an n×n×n cubic block of voxels) or based on some chosen image analysis (e.g. a feature detector that detects image features based on analysis of edges defined in a gradient image). For a larger region, the "value" of the region may be quantified, for example, as the maximum pixel value in that region, as is done in FIG. 2. For each region of the current update image it is determined in an operation 38 whether the evolution of the value of the region over update images prior to the current update image satisfies an artifact feature criterion. For the example of FIG. 2, the evolution of a real feature is rapid during the initial iterations and then levels off whereas the evolution of an artifact feature is more gradual and continues changing in later iterations—these different characteristics between real features versus artifact features enables defining a criterion for detecting an artifact feature.

Various algorithms may be used to quantify the evolution of the value of the region over successive iterations. In one approach, a difference ratio is computed:

$$\frac{\Delta f^{(m,n)}}{\Delta f^{(k,l)}} \quad (6)$$

where $\Delta f^{(k,l)}$ is a difference or absolute difference of the value of the corresponding pixel, voxel, or region in update images at iterations k and l and $\Delta f^{(m,n)}$ is a difference or absolute difference of the value of the corresponding pixel, voxel, or region in update images at iterations m and n. As illustration, for the example of FIG. 2, in the case of the indicated iteration numbers k, l, m, n it is seen that for a real feature the ratio $$\frac{\Delta f^{(m,n)}}{\Delta f^{(k,l)}}$$

will be much less than one, whereas for the hot spot (artifact feature) the ratio $$\frac{\Delta f^{(m,n)}}{\Delta f^{(k,l)}}$$

will be fairly close to one.

The foregoing approach may be performed over the image as a whole, by: computing a first difference image comprising a per-voxel or per-pixel difference or absolute difference between update images at iterations k and l of the iterative reconstruction; computing a second difference image comprising a per-voxel or per-pixel difference or absolute difference between update images at iterations m and n of the iterative reconstruction; and computing a ratio image comprising a per-voxel or per-pixel ratio of the first difference image and the second difference image. The resulting ratio image is then analyzed to detect regions with values close to one which are likely to be artifact features.

In an operation 40, local noise suppression is performed at any detected artifact feature. For example, in one approach the local noise suppression may entail replacing the value of the pixel, voxel, or region of the current update image whose evolution satisfies the artifact feature criterion with the value in an earlier update image. This approach is premised on the observation made herein that noise-induced artifact features tend to evolve later in the iterative reconstruction, so that the earlier update image will likely have reduced or absent noise-induced features. In another approach, the local noise suppression operation 40 replaces the value of the pixel, voxel, or region of the current update image whose evolution satisfies the artifact feature criterion with an aggregate value of neighboring pixels or voxels of the current update image. The local noise suppression is local, and is not performed for pixels, voxels, or regions of the current update image whose evolution does not satisfy the artifact feature criterion. Certain combination of the above can also be considered. The output of the operation 40 is then the update image with the local modifications 42, and this then serves as input to the next iterative reconstruction update 20.

The various image reconstruction computational components and data storage components may be implemented on an illustrative computer 50 or other electronic data processing device. The illustrative computer 50 includes a display 52 for displaying the reconstructed image, and includes one or more user input devices (e.g. a keyboard 54 and mouse 56) for receiving user input to select images or image slices or to otherwise enable a user to interact with the image reconstruction and/or the reconstructed image.

With reference now to FIGS. 5-8, some illustrative phantom experiments demonstrating effectiveness of the approach of locally detecting and suppressing noise-induced artifact features are described. The illustrative approaches employ a ratio image constructed as follows, where, referencing Equation (6), the indices l, m, and n are related to the index k as follows: l=m=k+x and n=k+2x. At iteration n=k+2x, each voxel of the image is compared to the same voxel of the image at iteration m=k+x, the difference is calculated as $\Delta f^{(k+x,k+2x)}$. Then for the same voxel, calculate the difference at iteration l=k+x and k to obtain $\Delta f^{(k,k+x)}$. Said another way, k is the starting iteration for the hot spot control, and x and 2x are the iteration intervals used to calculate the differences. Since true features are expected to evolve faster in earlier iterations compared with artifact features (see FIG. 2), for real features the ratio $$\frac{\Delta f^{(k+x,k+2x)}}{\Delta f^{(k,k+x)}}$$

is expected to be less than 1. In contrast, noise blobs and artificial hot spots are expected to evolve slowly but the evolution keeps going, so that the ratio $$\frac{\Delta f^{(k+x,k+2x)}}{\Delta f^{(k,k+x)}}$$

is expected to be greater than 1. By calculating the ratio $$\frac{\Delta f^{(k+x,k+2x)}}{\Delta f^{(k,k+x)}}$$

for each voxel a ratio image is formed, and one can determine whether a voxel belongs to artificial hot spots (due to noise) or belong to a normal structure of the image. The ratio image can be used to determine the probability that a voxel belongs to an artificial hot spot and the probability that a voxel belongs to a normal structure. Formally, this can be written as:

$$\Delta f^{(k,k+x)} = f^{(k+x)} - f^{(k)} \quad (7)$$
$$\Delta f^{(k+x,k+2x)} = f^{(k+2x)} - f^{(k+x)}$$
$$R = \frac{\Delta f^{(k+x,k+2x)}}{\Delta f^{(k,k+x)}}$$

In the case of cold structures in the images or features such as Gibbs artifacts, one can make use of the signs of the differences $\Delta f^{(k,k+x)}$ and $\Delta f^{(k+x,k+2x)}$ to assist the process. For example, for a cold region, the value usually goes down after a certain number of iterations; for Gibbs artifacts at hot regions, voxel values can go up first then go down, so the $\Delta f^{(k,k+x)}$ can be positive but $\Delta f^{(k+x,k+2x)}$ can be negative.

As shown in FIG. 1, for iterative reconstruction an initial image 24 is usually used to start the iterative reconstruction. If the average value of the initial image is too different from the true value, a large scaling effect exists, and it will take a few updates/iterations for the iterative reconstruction to offset such a scaling effect. Therefore, in general, n is preferably set to a number large enough so that image initialization scale is no longer significant. For the iteration interval x, one can use 1 or anything above 1. For Maximum Likelihood Expectation Maximization (MLEM) where there is only one subset for each iteration, k and x are in general larger than for OSEM for which there are multiple subsets in each iterations.

Figure 5:
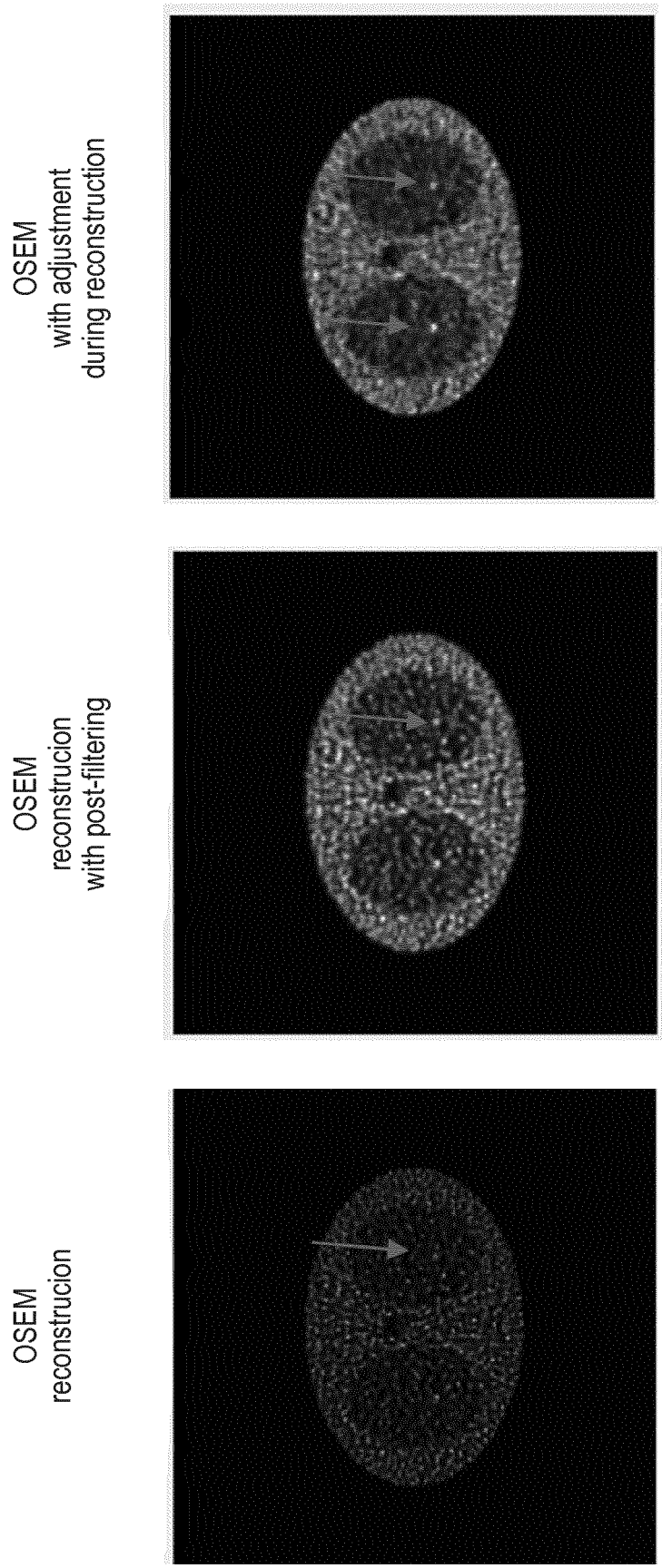

With reference to FIG. 5, a first illustrative phantom reconstruction example is presented. FIG. 5 illustrates the effect of the processing 36, 38, 40 on noise control in OSEM reconstruction in a 2D simulation study with 400,000 events (TOF resolution 320 ps, TOF reconstruction). Noise blobs in the lungs were significantly reduced with the hot spot control with OSEM using the processing 36, 38, 40 (FIG. 5 right image) as compared to both the conventional OSEM image (FIG. 5 left image) and the OSEM image with post-filtering (FIG. 5 middle image). For hot spot control in the example of FIG. 5, right image, k was first set to 1, and x was set to 1. The adjustment was as follows: if for a voxel the value R was greater than 0.85, then the voxel would stop evolution. Then k was set to 2, and x stayed at 1, the R was recalculated for each voxel and the noise/hot spot suppression process was repeated. As a result of this process, different voxels might be identified as being due to hot spots at different iterations, and were stopped for evolution at the iteration n that they were identified. Effectively, this approach performed both hot spot identification and suppression. As seen in FIG. 5, the images show that the hot spot control using the processing 36, 38, 40 (FIG. 5 right image) was significantly better than without the control, and was also significantly better than using a low-pass Gaussian filter for post reconstruction filtering (FIG. 5 middle image).

Figure 6:
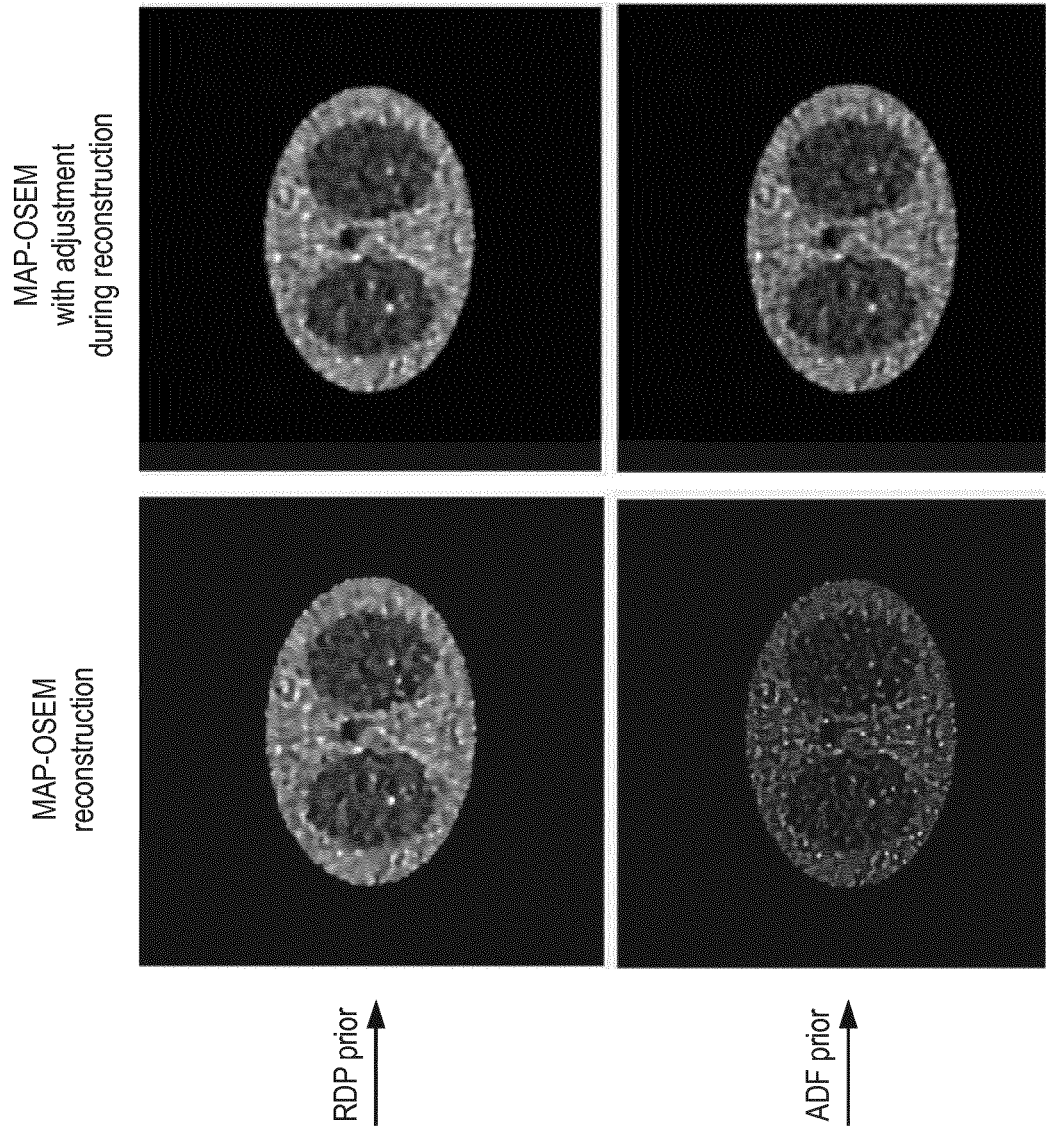

With reference to FIG. 6, a second illustrative phantom reconstruction example is presented. FIG. 6 illustrates the effect of the processing 36, 38, 40 on noise and hot spot control in an MAP-OSEM reconstruction of the same 2D simulation study in FIG. 5. Noise blobs in the lungs and artificial hot spots in the images were significantly reduced with the hot spot control of processing 36, 38, 40 (FIG. 6, right images) as compared to without such processing (FIG. 6, left images). The top row of FIG. 6 is for OSEM-MAP using RDP prior ($\beta$=20, $\gamma$=0.1). The bottom row is for OSEM-MAP using an ADF prior (see Zhu et al, Med Bio. Eng. Comput, 44:983-997 (2006)) with $\beta$=0.05 and $\gamma$=0.1. Both the RDP and ADF priors showed artificial hot spots in the reconstructed images without hot spot control using the processing 36, 38, 40 but significant suppression of the artificial hot spots using the processing 36, 38, 40.

Figure 7:
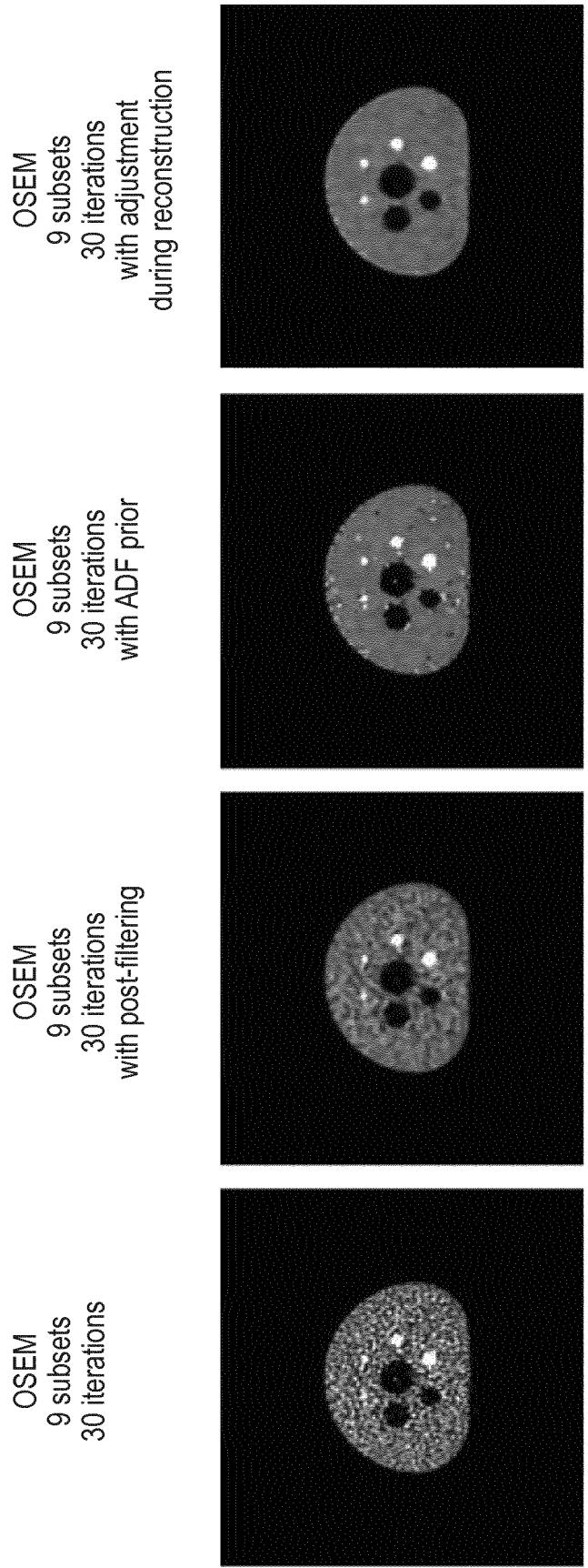

With reference to FIG. 7, a second illustrative phantom reconstruction example is presented. FIG. 7 illustrates the effect of using the processing 36, 38, 40 with OSEM-MAP reconstruction of a NEMA IQ body phantom study acquired on a Philips Vereos digital PET system (available from Koninklijke Philips N.V., Eindhoven, the Netherlands). The leftmost image of FIG. 7 shows reconstruction using the OSEM algorithm with 9 subsets and 30 iterations. The image appeared noisy because of the large number of iterations. The second image from the left shows the effect of applying post-reconstruction filtering in the form of a median filter with window radius of 2 voxels to the leftmost image for noise reduction. Noise was significantly reduced but still the texture of the image was blobby. The third image from left was produced using OSEM-MAP with ADF prior, same number of iterations. Overall noise was significantly reduced as compared to the leftmost image, however, there were some hot spots in the uniform region of the phantom. The rightmost image of FIG. 7 was produced using the noise/hot spot control processing 36, 38, 40 in the OSEM-MAP reconstruction. The artificial hot spots were all removed, the image shows superior quality as compared with the left three images. The quantitation of the true features, i.e., the spheres in the phantom, was only changed slightly. For example, the average of the smallest hot sphere (the 10 mm sphere) was 334.3 in the left image, 341 in the third image, and 344.9 in the rightmost image, the difference was less than 1%. The mean value of the 17 mm hot sphere was 537.0, 532.7, and 547.1 for the first, third, and rightmost images. The difference between the left and right images was less than 2%. The largest quantitative difference was shown in the 13 mm sphere: the maximum values were 626.4, 626.3, and 557.8 for the first, third, and the rightmost image, respectively. The difference was about 11%.

Figure 8:
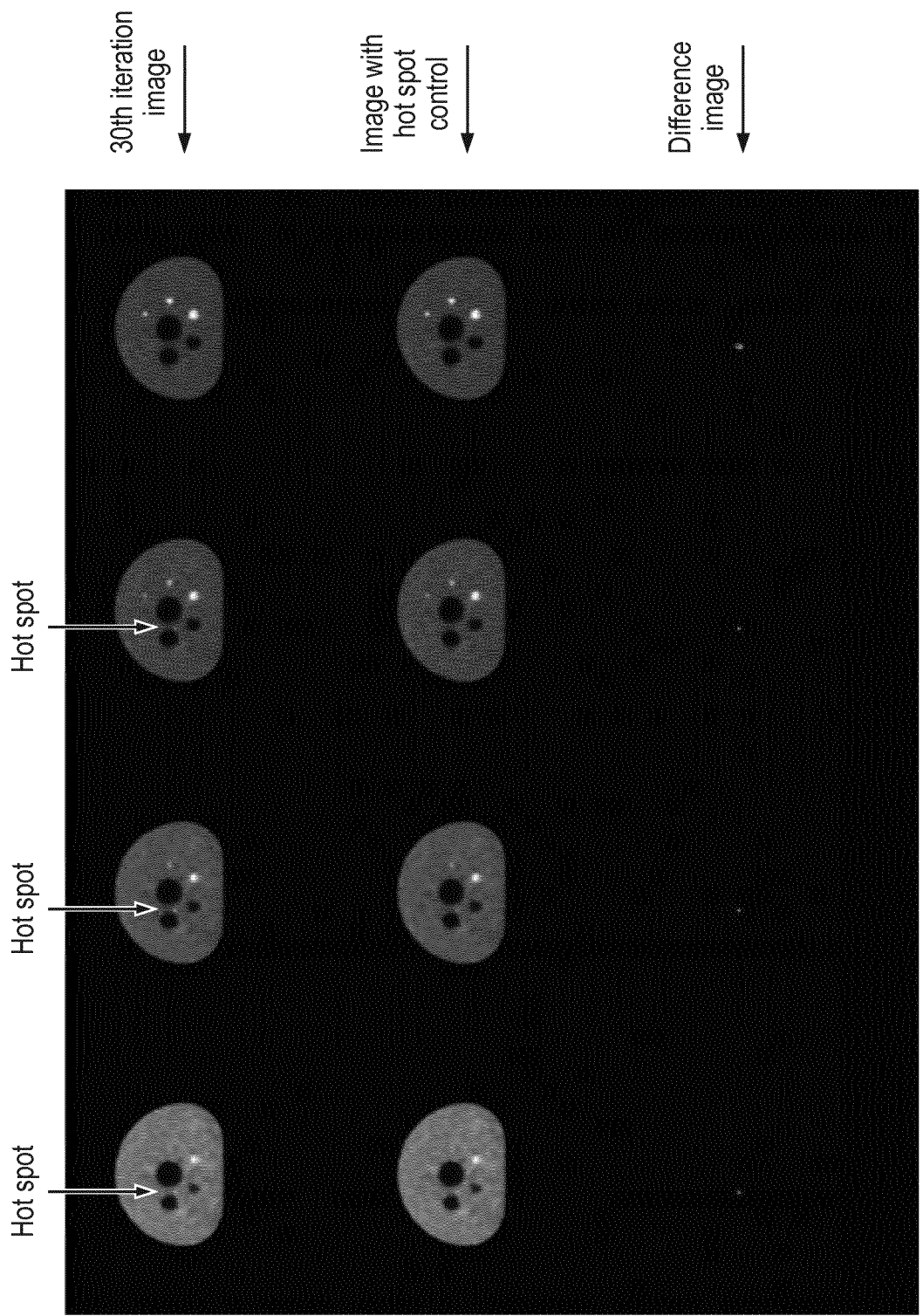

With reference to FIG. 8, in another embodiment the images are first reconstructed using an iterative reconstruction. Some or all of the intermediate update images (i.e. update images prior to the terminating reconstructed image) are saved in the storage 34. For example, the intermediate update image at iterations, k+x, and k+2x may be saved in the storage 34, while the other intermediate update images are discarded. For each voxel of the image, the mechanism previously described is used to determine if it belongs to a hot spot or a normal structure. FIG. 8 shows results of this approach, where the update images at the k+2x=30th, k+x=20th, and k=10th iteration are saved out for the noise/hot spot control, and the artificial hot spot in the 30th iteration image is successfully removed. True features showed no difference both visually and quantitatively (difference less than 0.1%). The images shown in FIG. 8 are as follows. The four columns depict four different slices. Top row: 30th iteration image that showed an artificial hot spot at the 9 o'clock position near the 37 mm cold sphere. Middle row: image with the hot spot control. Bottom row: difference image between the top and middle images. The difference was only at/near the hot spot region. No difference was shown in the true features: all the spheres, hot or cold.

It will be appreciated that the disclosed adjustment process embodiments diagrammatically shown in FIG. 1 (i.e. the programmed adjustment 30 of the edge preservation threshold of an edge-preserving regularization prior and the local detection/suppression of artifact features) may be used alone or in combination. Using the two adjustment processes in combination can provide synergistic benefit: for example, if at a later iteration the suppression operation 40 replaces a noise-induced artifact feature with an earlier version of the region for which the noise amplification is lower, then at this later iteration the lower value of the edge preservation threshold $\gamma$ is likely to more effectively suppress the noise as compared with the earlier iterations having larger $\gamma$.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A non-transitory storage medium storing instructions readable and executable by a computer to perform an image reconstruction method comprising:

performing iterative reconstruction of imaging data to generate a sequence of update images terminating at a reconstructed image, the iterative reconstruction includes an edge-preserving regularization prior having an edge preservation threshold; and during the iterative reconstruction and before the iterative reconstruction terminates at the reconstructed image, adjusting at least one of an update image produced by the iterative reconstruction and a parameter of the iterative reconstruction using an adjustment process separate from the iterative reconstruction;

wherein the adjusting is performed separate from the iterative reconstruction and the adjustment process comprises adjusting the edge preservation threshold to reduce gradient steepness above which edge preservation applies for later iterations of the iterative reconstruction compared with earlier iterations of the iterative reconstruction.

2. The non-transitory storage medium of claim 1 wherein:
the edge-preserving regularization prior comprises a relative difference prior having an edge preservation threshold $\gamma$ for which edge preservation increases with increasing $\gamma$; and
the adjustment process comprises decreasing the edge preservation threshold $\gamma$ with increasing number of iterations of the iterative reconstruction.

3. The non-transitory storage medium of claim 1 wherein:
the edge-preserving regularization prior comprises a relative difference prior proportional to:

$$\frac{(f_i - f_j)^2}{f_i + f_j + \gamma|f_i - f_j|}$$

where $\gamma$ is the edge preservation threshold and $f_i$ and $f_j$ are image pixels or voxels; and
the adjustment process comprises decreasing the edge preservation threshold $\gamma$ with increasing number of iterations of the iterative reconstruction.

4. The non-transitory storage medium of claim 1 wherein the adjustment process comprises:

for each pixel, voxel, or region of a current update image that precedes the terminating reconstructed image in the iterative reconstruction, determining whether an evolution of the value of the pixel, voxel, or region over update images prior to the current update image satisfies an artifact feature criterion; and performing a local noise suppression operation for any pixel, voxel, or region of the current update image whose evolution satisfies the artifact feature criterion and not performing the local noise suppression operation for any pixel, voxel, or region of the current update image whose evolution does not satisfy the artifact feature criterion.

5. The non-transitory storage medium of claim 4 wherein the determining comprises:

computing a first difference image comprising a per-voxel or per-pixel difference or absolute difference between update images at iterations k and l of the iterative reconstruction;

computing a second difference image comprising a per-voxel or per-pixel difference or absolute difference between update images at iterations m and n of the iterative reconstruction;

computing a ratio image comprising a per-voxel or per-pixel ratio of the first difference image and the second difference image; and determining whether the evolution of each pixel, voxel, or region of the current update image satisfies the artifact feature criterion by determining whether the corresponding pixel, voxel, or region of the ratio image satisfies the artifact feature criterion.

6. The non-transitory storage medium of claim 4 wherein the determining comprises:

for each pixel, voxel, or region of the current update image, computing a difference ratio:

$$\frac{\Delta f^{(m,n)}}{\Delta f^{(k,l)}}$$

where $\Delta f^{(k,l)}$ is a difference or absolute difference of the value of the corresponding pixel, voxel, or region in update images at iterations k and l and $\Delta f^{(m,n)}$ is a difference or absolute difference of the value of the corresponding pixel, voxel, or region in update images at iterations m and n; and determining whether the evolution of each pixel, voxel, or region of the current update image satisfies the artifact feature criterion by determining whether the corresponding difference ratio satisfies the artifact feature criterion.

7. The non-transitory storage medium of claim 4 wherein the local noise suppression operation comprises replacing the value of the pixel, voxel, or region of the current update image whose evolution satisfies the artifact feature criterion with the value of the corresponding pixel, voxel, or region in an earlier update image.

8. The non-transitory storage medium of claim 4 wherein the local noise suppression operation comprises replacing the value of the pixel, voxel, or region of the current update image whose evolution satisfies the artifact feature criterion with an aggregate value of neighboring pixels or voxels of the current update image.

9. The non-transitory storage medium of claim 1 wherein the imaging data comprise one of positron emission tomography (PET) imaging data, single photon emission computed tomography (SPECT) imaging data, and transmission computed tomography (CT) imaging data.

10. An image reconstruction device comprising:
a non-transitory storage medium as set forth in claim 1; and
a computer connected to read and execute the instructions stored on the non-transitory storage medium to perform the image reconstruction method.

11. An image reconstruction method comprising:
reconstructing imaging data by performing iterative reconstruction with an edge-preserving regularization prior to generate a reconstructed image;
during the iterative reconstruction, adjusting an edge preservation threshold of the edge-preserving regularization prior as a function of the number of performed iterations of the iterative reconstruction, wherein the adjusting is performed separate from the iterative reconstruction, the adjusting comprising adjusting the edge preservation threshold to reduce gradient steepness above which edge preservation applies for later iterations of the iterative reconstruction compared with earlier iterations of the iterative reconstruction; and displaying the reconstructed image on a display;

wherein the reconstructing and the adjusting are performed using a computer.

12. The image reconstruction method of claim 11 wherein:

the edge-preserving regularization prior has an edge preservation threshold γ for which edge preservation increases with increasing γ; and the adjusting comprises decreasing the edge preservation threshold γ as the number of performed iterations of the iterative reconstruction increases.

13. The image reconstruction method of claim 11 wherein:

the edge-preserving regularization prior is proportional to:

$$\frac{(f_i - f_j)^2}{f_i + f_j + \gamma |f_i - f_j|}$$

where γ is the edge preservation threshold and $f_i$ and $f_j$ are image pixels or voxels; and the adjusting comprises decreasing the edge preservation threshold γ with increasing number of iterations of the iterative reconstruction.

14. The image reconstruction method of claim 11 further comprising:

acquiring the imaging data as one of:

positron emission tomography (PET) imaging data acquired using a PET imaging device, single photon emission computed tomography (SPECT) imaging data acquired using a gamma camera, and transmission computed tomography (CT) imaging data acquired using a CT imaging device.

15. An image reconstruction device comprising:

a computer programmed to perform iterative reconstruction of imaging data to generate a sequence of update images terminating at a reconstructed image; and a display operatively connected with the computer to display the reconstructed image;

wherein the computer is further programmed to adjust a current update image of the iterative reconstruction that precedes the terminating reconstructed image in the iterative reconstruction by operations including:

for each pixel, voxel, or region of the current update image, determining whether an evolution of the value of the pixel, voxel, or region over update images prior to the current update image in the iterative reconstruction satisfies an artifact feature criterion; and performing a local noise suppression operation for any pixel, voxel, or region of the current update image whose evolution satisfies the artifact feature criterion and not performing the local noise suppression operation for any pixel, voxel, or region of the current update image whose evolution does not satisfy the artifact feature criterion.

16. The image reconstruction device of claim 15 wherein the determining comprises:

computing a first difference image comprising a per-voxel or per-pixel difference or absolute difference between update images at iterations k and l of the iterative reconstruction;

computing a second difference image comprising a per-voxel or per-pixel difference or absolute difference between update images at iterations m and n of the iterative reconstruction;

computing a ratio image comprising a per-voxel or per-pixel ratio of the first difference image and the second difference image; and determining whether the evolution of each pixel, voxel, or region of the current update image satisfies the artifact feature criterion by determining whether the corresponding pixel, voxel, or region of the ratio image satisfies the artifact feature criterion.

17. The image reconstruction device of claim 15 wherein the determining comprises:

for each pixel, voxel, or region of the current update image, computing a difference ratio $$\frac{\Delta f^{(m,n)}}{\Delta f^{(k,l)}}$$

where $\Delta f^{(k,l)}$ is a difference or absolute difference of the value of the corresponding pixel, voxel, or region in update images at iterations k and l and $\Delta f^{(m,n)}$ is a difference or absolute difference of the value of the corresponding pixel, voxel, or region in update images at iterations m and n; and determining whether the evolution of each pixel, voxel, or region of the current update image satisfies the artifact feature criterion by determining whether the corresponding difference ratio satisfies the artifact feature criterion.

18. The image reconstruction device of claim 15 wherein the local noise suppression operation comprises replacing the value of the pixel, voxel, or region of the current update image whose evolution satisfies the artifact feature criterion with the value of the corresponding pixel, voxel, or region in an earlier update image.

19. The image reconstruction device of claim 15 wherein the local noise suppression operation comprises replacing the value of the pixel, voxel, or region of the current update image whose evolution satisfies the artifact feature criterion with an aggregate value of neighboring pixels or voxels of the current update image.

* * * * *